(12) United States Patent
Carralero et al.

(10) Patent No.: US 7,999,667 B2
(45) Date of Patent: Aug. 16, 2011

(54) VEHICLE HEALTH MANAGEMENT SYSTEM

(75) Inventors: Michael Alexander Carralero, Huntington Beach, CA (US); Kirby J. Keller, Chesterfield, MO (US); Charles E. Morris, Des Peres, MO (US)

(73) Assignee: The Boeing Company, Chicago, IL (US)

( * ) Notice: Subject to any disclaimer, the term of this patent is extended or adjusted under 35 U.S.C. 154(b) by 313 days.

(21) Appl. No.: 12/349,643

(22) Filed: Jan. 7, 2009

(65) Prior Publication Data

US 2010/0171630 A1 Jul. 8, 2010

(51) Int. Cl.
*G08B 1/00* (2006.01)
(52) U.S. Cl. ......... 340/531; 340/506; 340/384.1; 340/691.8; 340/10.33; 701/29; 701/30; 701/34; 701/35; 702/183; 702/185; 702/188
(58) Field of Classification Search ......... 340/531, 340/506, 584.1, 691.8, 961, 10.33, 311; 701/29, 701/30, 34, 35; 702/183, 185, 188
See application file for complete search history.

(56) References Cited

U.S. PATENT DOCUMENTS

| 4,414,539 | A | | 11/1983 | Armer |
| 5,184,516 | A | * | 2/1993 | Blazic et al. ............ 73/799 |
| 6,691,007 | B2 | | 2/2004 | Haugse et al. |
| 6,898,492 | B2 | * | 5/2005 | de Leon et al. ......... 701/35 |
| 6,912,671 | B2 | | 6/2005 | Christensen et al. |

* cited by examiner

*Primary Examiner* — Tai T Nguyen
(74) *Attorney, Agent, or Firm* — Yee & Associates, P.C.

(57) ABSTRACT

A method, apparatus, and computer program product for processing health management data for a vehicle. A plurality of modulated signals is received on a bus system in the vehicle. The plurality of modulated signals contains health management data from a plurality of data acquisition units. Each modulated signal has a different frequency from another modulated signal in the plurality of modulated signals to form a plurality of frequencies. The plurality of frequencies is selected to avoid interference with other data transmitted over the bus system by a plurality of data processing systems in the vehicle. The plurality of modulated signals is processed based on the plurality of frequencies used to transmit the plurality of modulated signals.

20 Claims, 6 Drawing Sheets

VEHICLE HEALTH MANAGEMENT SYSTEM

BACKGROUND INFORMATION

1. Field

The present disclosure relates generally to an improved data processing system and in particular to a method and apparatus for monitoring a vehicle. Still more particularly, the present disclosures relates to a method and apparatus for monitoring the health of a vehicle.

2. Background

A vehicle health management system may collect and process data related to a vehicle. When the vehicle health management system is located in or integrated into the vehicle, the vehicle health management system may be referred to as an integrated vehicle or health management system. The data collected about the vehicle may be used to identify the current state of the vehicle. This current state may also be referred to as the health of the vehicle. The data may also be used to predict the future state or health of the vehicle.

A vehicle health management system may include a number of different components. For example, the vehicle health management system may include data processing systems and sensors. The sensors may gather data about the vehicle while the data processing systems collect and/or process the data.

Examples of the types of data that may be monitored include temperatures of various components, voltage, strain, acceleration, pressure, and/or other suitable types of data.

The use of integrated vehicle health management systems may have many different benefits. For example, reduced maintenance may be required through the identification of anomalies that may lead to incorrect performance of components that may lead to increased operating expenses. Further, with the use of vehicle health management systems, improved maintenance scheduling and logistic support may be provided.

The monitoring of a vehicle may include the monitoring of many different components. These components may include, for example, without limitations, a frame, structures, engines, a transmission, electronic devices, and/or other suitable components in a vehicle.

SUMMARY

In one advantageous embodiment, a method is present for processing health management data for a vehicle. A plurality of modulated signals is received on a bus system in the vehicle. The plurality of modulated signals contains health management data from a plurality of data acquisition units. Each modulated signal has a different frequency from another modulated signal in the plurality of modulated signals to form a plurality of frequencies. The plurality of frequencies is selected to avoid interference with other data transmitted over the bus system by a plurality of data processing systems in the vehicle. The plurality of modulated signals is processed based on the plurality of frequencies used to transmit the plurality of modulated signals.

In another advantageous embodiment, a vehicle comprises a bus system, a first data processing system connected to the bus, a second data processing system connected to the bus, and a number of data acquisition units connected to the bus system. The first data processing system and the second data processing system exchange data with each other over the bus system. The number of data acquisition units connected to the bus system are capable of testing the bus system for errors and capable of transmitting health management data over the bus system using a frequency that avoids interfering with data transferred between the first data processing system and the second data processing system.

In yet another advantageous embodiment, a computer program product for processing health management data for a vehicle comprises a computer recordable storage medium, and program code stored on the computed recordable storage medium. Program code may be present for receiving a plurality of modulated signals on a bus system in the vehicle. The plurality of modulated signals contains health management data from a plurality of data acquisition units. Each modulated signal has a different frequency from another modulated signal in the plurality of modulated signals to form a plurality of frequencies. The plurality of frequencies is selected to avoid interference with other data transmitted over the bus system by a plurality of data processing systems in the vehicle. Program code may also be present for processing the plurality of modulated signals based on the plurality of frequencies used to transmit the plurality of modulated signals.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
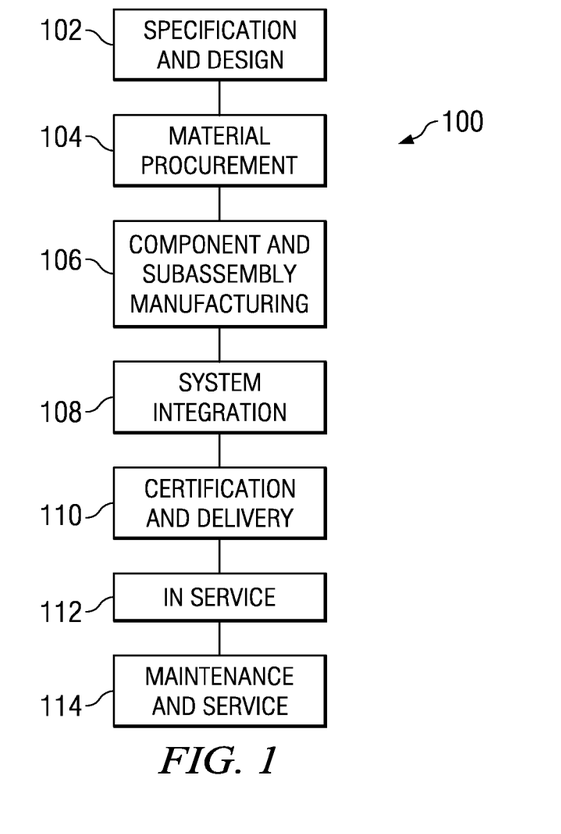
FIG. 1 is a diagram illustrating an aircraft manufacturing and service method in accordance with an advantageous embodiment.
Figure 2:
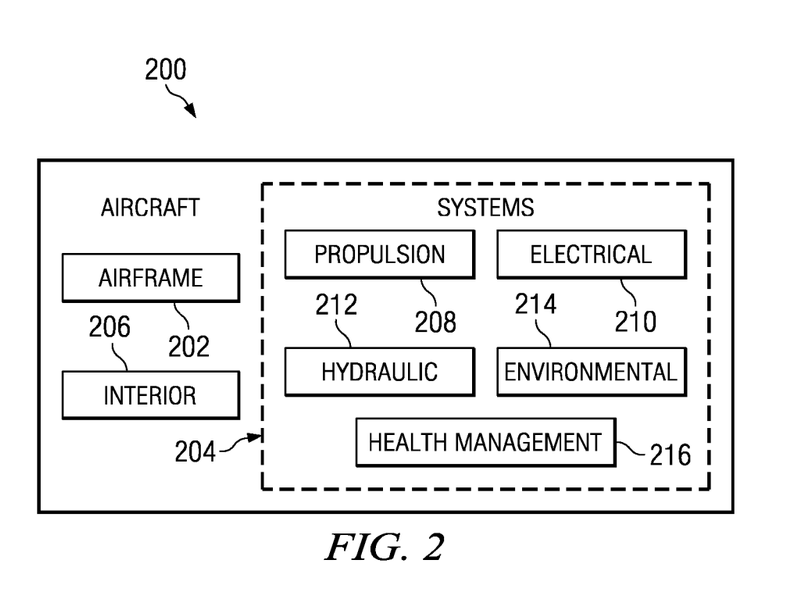
FIG. 2 is a diagram of an aircraft in which an advantageous embodiment may be implemented.

Referring more particularly to the drawings, embodiments of the disclosure may be described in the context of the aircraft manufacturing and service method 100 as shown in FIG. 1 and aircraft 200 as shown in FIG. 2. Turning first to FIG. 1, a diagram illustrating an aircraft manufacturing and service method is depicted in accordance with an advantageous embodiment. During pre-production, exemplary aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, a diagram of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, environmental system 214, and health management system 216. Any number of other systems may be included. Although an aerospace example is shown, different advantageous embodiments may be applied to other industries, such as the automotive industry.

Apparatus and methods embodied herein may be employed during any one or more of the stages of aircraft manufacturing and service method 100 in FIG. 1. For example, components or subassemblies produced in component and subassembly manufacturing 106 in FIG. 1 may be fabricated or manufactured in a manner similar to components or subassemblies produced while aircraft 200 is in service 112 in FIG. 1.

Also, one or more apparatus embodiments, method embodiments, or a combination thereof may be utilized during production stages, such as component and subassembly manufacturing 106 and system integration 108 in FIG. 1, for example, without limitation, by substantially expediting the assembly of or reducing the cost of aircraft 200. Similarly, one or more of apparatus embodiments, method embodiments, or a combination thereof may be utilized while aircraft 200 is in service 112 or during maintenance and service 114 in FIG. 1. For example, advantageous embodiments may be implemented during system integration 108 to install health management system 216 in aircraft 200. In other advantageous embodiments, health management system 216 may be installed and/or modified during maintenance and service 114.

The different advantageous embodiments recognize that health management systems may require the installation of additional wires and buses. Further, the different advantageous embodiments recognize and take into account that installing and/or attaching components for a health management system may not be easily accomplished with currently available networks in an aircraft.

The different data processing systems on an aircraft require certain levels of bandwidth to function properly. Interference with bandwidth availability may cause errors or incorrect results in analyzing data and generating commands.

As a result, the different advantageous embodiments recognize and take into account that currently used health management systems may be implemented by adding additional buses and/or wires to provide a separate system that does not use up the bandwidth of existing networks for data processing systems of an aircraft. The different advantageous embodiments recognize and take into account that this type of architecture may increase the expense and weight of an aircraft by requiring additional wires and/or buses to interconnect components.

Thus, the different advantageous embodiments provide a method and apparatus for processing health management data for a vehicle. In or more of the different advantageous embodiments, modulated signals may be received on a bus system that is used by data processing systems to transmit data.

These signals may be modulated signals, containing health management data from a number of different data acquisition units. Each modulated signal has a different frequency from another modulated signal.

The frequencies of these modulated signals are selected to avoid interference with other data transmitted over the bus system by the other data processing systems. In this manner, the different advantageous embodiments may avoid reducing available bandwidth for other data processing systems. These signals may then be processed based on the frequencies used to transmit these signals.

Figure 3:
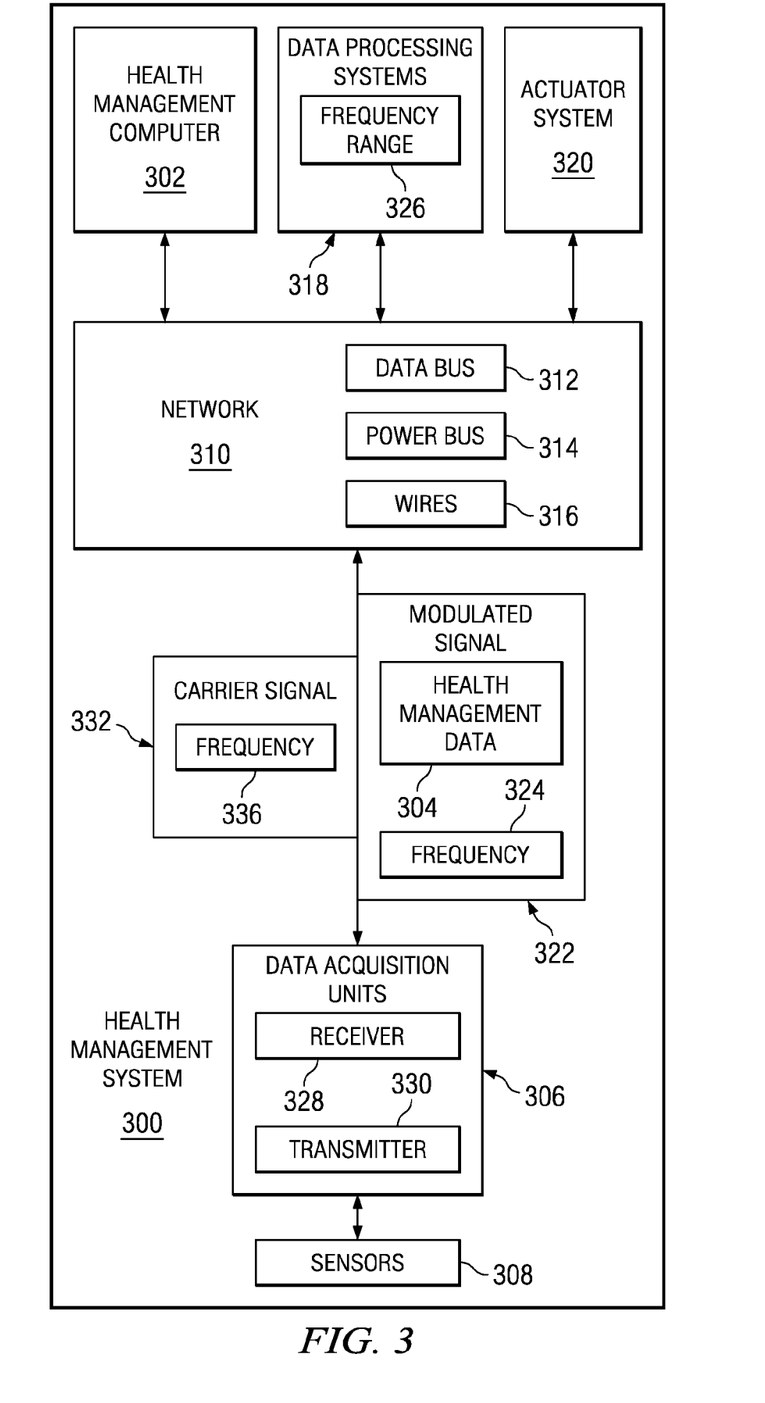
FIG. 3 is a diagram of a health management system in accordance with the advantageous embodiment.

With reference now to FIG. 3, the diagram of a health management system is depicted in accordance with the advantageous embodiment. Health management system 300 is an example of health management system 216 in aircraft 200 in FIG. 2. Health management computer 302 in health management system 302 may receive health management data 304 from data acquisition units 306.

Health management data 304 may be any data about the state of vehicle in which health management system 300 is implemented. For example, without limitation, when health management system 300 is implemented in aircraft 200 in FIG. 2, health management data 304 may be data about the state of components such as airframe 202 and/or systems 204. Health management data 304 may be, for example, without limitation, a temperature, a voltage, a pressure, an acceleration, an orientation of a component, an amount of air, a comparison of signals, or some other suitable type of data about aircraft 200 that may be used to identify the health of aircraft 200.

Data acquisition units 306 may generate health management data 304 using sensors 308. A sensor within sensors 308 is a device that measures a physical quantity and converts that quantity into a signal that is detected by data acquisition units 306. In these examples, data acquisition units 306 may be connected to network 310.

Network 310 may include a number of different types of connections. For example, network 310 may include data bus 312, power bus 314, wires 316, and/or other suitable types of connections. In these examples, the different buses and/or wires may be electrical and/or optical wires.

Data bus 312 is a system that transfers data between different devices, such as data processing systems, peripheral devices, or other suitable hardware. Data bus 312 may provide for exchange of data between data process systems 318. Data processing systems 318 may be, for example, a line replaceable unit (LRU), a flight management computer, a controller, or some other suitable device in which data is exchanged.

Power bus 314 is a power distribution system that provides power to various devices within the vehicle. Wires 316 may provide connections to send data and commands to different components such as actuator system 320.

In these examples, health management data 304 may be sent between data acquisition units 306 and/or health management computer 302 over any of the illustrated systems within network 310. When sending data over data bus 312, data acquisition units 306 may send this data to health management data 304 in modulated signal 322 using frequency 324.

In these illustrative examples, frequency 324 is a frequency outside the frequency range 326 used by data processing systems 318 to transmit data. Additionally, frequency 324 may be selected such that different data acquisition units within data acquisition units 306 may use different frequencies to add additional communication channels.

Frequency 324 may be any frequency that avoids interfering with data transferred by data processing systems 318 using frequency range 326. For example, frequency 324 may not be some frequencies around frequency range 326 if those frequencies interfere with data transferred by data processing systems 318 even though those frequencies are outside of frequency range 326. In this manner, bandwidth for data processing systems 318 may remain available for data processing systems 318.

In this manner, health management data 304 may be transmitted transmit from data acquisition units 306 to health management computer 302 and between data acquisition unit 306 in a manner that reduces and/or avoids interference with the data transmitted between data processing systems 318.

One of the data acquisition units within data acquisition units 306 may function as receiver 328 to receive signals from other data acquisition units within data acquisition units 306.

Receiver 328 may identify a particular data acquisition unit within data acquisition unit 306 using frequency 324 and modulated signal 322. In other advantageous embodiments, receiver 328 may identify the data acquisition unit through and identify other information within modulated signal 322.

In this manner, receiver 328 may act as a router and may send the signal to an appropriate destination based on the identification of the data acquisition unit sending the signal. The identification of a particular transmitting data acquisition unit also may be used to further process the health management data. For example, receiver 328 may process the signal and/or add an identification of the data acquisition unit sending the signal using the frequency of the signal. Receiver 328 may then send health management data 304 to the destination based on the identification of the data acquisition unit transmitting the signal.

Further, in other advantageous embodiments, data acquisition units 306 may transmit signals at different time periods. Each data acquisition unit within data acquisition units 306 may transmit data at different time periods to reduce the amount of traffic on network 310.

Additionally, data acquisition units 306 may perform testing of network 310. Data acquisition units 306 may be present in different locations and/or branches within network 310. Data acquisition units 306 may send test signals between each other to determine whether different branches or sections of network 310 have faults. This type of testing may be used to identify intermittent faults as well as hard faults.

An intermittent fault is a fault that occurs sometimes and is not always present. A hard fault is a fault that is always present. A data acquisition unit within data acquisition units 306 may act as transmitter 330, which generates carrier signal 332 and sends that carrier signal 332 to receiver 328. Receiver 328 determines whether carrier signal 332 has been distorted. If carrier signal 332 is not distorted and is received as expected, transmitter 330 may then generate modulated signal 322.

Modulated signal 322 may be generated by changing characteristics of a periodic wave form such as, for example, carrier signal 332. Carrier signal 332 may be changed in amplitude, base, and/or frequency. The changes to one or more of these parameters in a wave form may be made to include data and/or convey a message.

In the different advantageous embodiments, phase and/or amplitude may be changed in carrier signal 332. Frequency 336 of carrier signal 332 may remain unchanged. In these examples, frequency 336 is not changed because frequency 336 may be used to identify the sender or originator of the data in addition to avoiding interference with data being sent over other frequencies.

Modulated signal 322 may contain test data. Modulated signal 322 is then transmitted from transmitter 330 to receiver 328. Receiver 328 compares carrier signal 332 with a prior modulated signal to determine whether a fault is present. This prior modulated signal may be an expected test pattern or previously sent modulated signal. In these examples, the result of this comparison is health management data 304. By repeatedly performing this type of test, intermittent faults within network 310 may be identified. Of course, other forms of tests may be performed in other advantageous embodiments to determine whether intermittent and/or hard faults are present.

The illustration of health management system 300 in FIG. 3 is not meant to imply physical or architectural limitations to the manner in which different advantageous embodiments may be implemented. For example, in some advantageous embodiments, other components may in addition to, or in place of, the components illustrated may be used.

Further, in some advantageous embodiments, some components may be unnecessary. In one illustrative example, health management system 300 may not require power bus 314 for transmitting health management data 304. As another example, in other advantageous embodiments, health management computer 302 may be unnecessary. Instead, receiver 328 and data acquisition units 306 may transmit the data to a remote data processing system for analysis.

Figure 4:
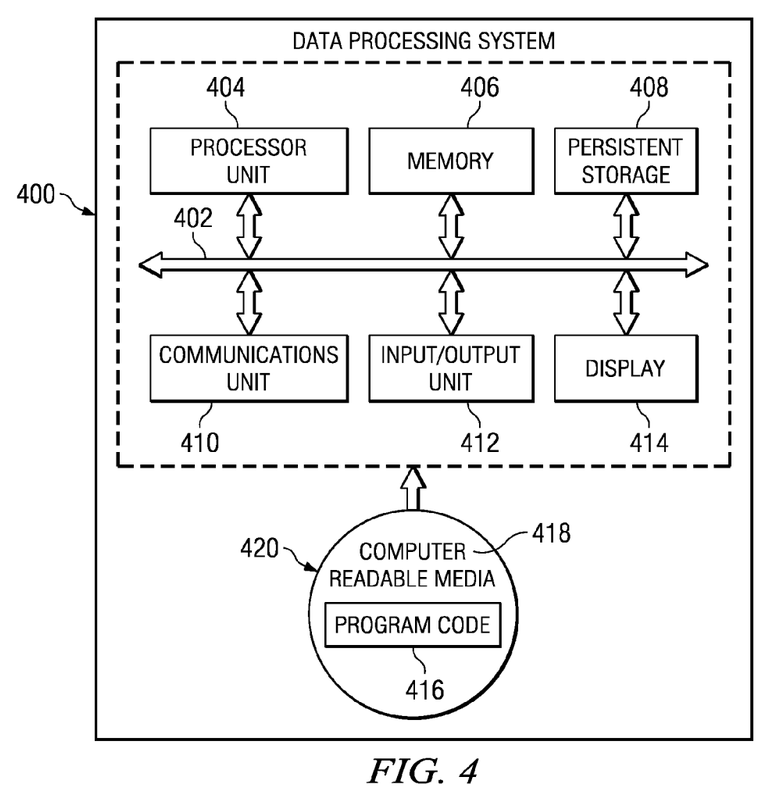
FIG. 4 is a diagram of a data processing system in accordance with an illustrative embodiment.

Turning now to FIG. 4, a diagram of a data processing system is depicted in accordance with an illustrative embodiment. In this illustrative example, data processing system 400 includes communications fabric 402, which provides communications between processor unit 404, memory 406, persistent storage 408, communications unit 410, input/output (I/O) unit 412, and display 414.

Processor unit 404 serves to execute instructions for software that may be loaded into memory 406. Processor unit 404 may be a set of one or more processors or may be a multi-processor core, depending on the particular implementation. Further, processor unit 404 may be implemented using one or more heterogeneous processor systems in which a main processor is present with secondary processors on a single chip. As another illustrative example, processor unit 404 may be a symmetric multi-processor system containing multiple processors of the same type.

Memory 406 and persistent storage 408 are examples of storage devices. A storage device is any piece of hardware that is capable of storing information either on a temporary basis and/or a permanent basis. Memory 406, in these examples, may be, for example, a random access memory or any other suitable volatile or non-volatile storage device.

Persistent storage 408 may take various forms depending on the particular implementation. For example, persistent storage 408 may contain one or more components or devices. For example, persistent storage 408 may be a hard drive, a flash memory, a rewritable optical disk, a rewritable magnetic tape, or some combination of the above. The media used by persistent storage 408 also may be removable. For example, a removable hard drive may be used for persistent storage 408.

Communications unit 410, in these examples, provides for communications with other data processing systems or devices. In these examples, communications unit 410 is a network interface card. Communications unit 410 may provide communications through the use of either or both physical and wireless communications links.

Input/output unit 412 allows for input and output of data with other devices that may be connected to data processing system 400. For example, input/output unit 412 may provide a connection for user input through a keyboard, a mouse, and/or some other suitable input device. Input/output unit 412 also may include one or more of these devices. Further, input/output unit 412 may send output to a printer. Display 414 provides a mechanism to display information to a user.

Instructions for the operating system and applications or programs are located on persistent storage 408. These instructions may be loaded into memory 406 for execution by processor unit 404. The processes of the different embodiments may be performed by processor unit 404 using computer implemented instructions, which may be located in a memory, such as memory 406.

These instructions are referred to as program code, computer usable program code, or computer readable program code that may be read and executed by a processor in processor unit 404. The program code in the different embodiments may be embodied on different physical or tangible computer readable media, such as memory 406 or persistent storage 408.

Program code 416 is located in a functional form on computer readable media 418 that is selectively removable and may be loaded onto or transferred to data processing system 400 for execution by processor unit 404. Program code 416 and computer readable media 418 form computer program product 420 in these examples. In one example, computer readable media 418 may be in a tangible form, such as, for example, an optical or magnetic disc that is inserted or placed into a drive or other device that is part of persistent storage 408 for transfer onto a storage device, such as a hard drive that is part of persistent storage 408.

In a tangible form, computer readable media 418 also may take the form of a persistent storage, such as a hard drive, a thumb drive, or a flash memory that is connected to data processing system 400. The tangible form of computer readable media 418 is also referred to as computer recordable storage media. In some instances, computer readable media 418 may not be removable.

Alternatively, program code 416 may be transferred to data processing system 400 from computer readable media 418 through a communications link to communications unit 410 and/or through a connection to input/output unit 412. The communications link and/or the connection may be physical or wireless in the illustrative examples. The computer readable media also may take the form of non-tangible media, such as communications links or wireless transmissions containing the program code.

In some illustrative embodiments, program code 416 may be downloaded over a network to persistent storage 408 from another device or data processing system for use within data processing system 400. For instance, program code stored in a computer readable storage medium in a server data processing system may be downloaded over a network from the server to data processing system 400. The data processing system providing program code 416 may be a server computer, a client computer, or some other device capable of storing and transmitting program code 416.

The different components illustrated for data processing system 400 are not meant to provide architectural limitations to the manner in which different embodiments may be implemented. The different illustrative embodiments may be implemented in a data processing system including components in addition to or in place of those illustrated for data processing system 400. Other components shown in FIG. 4 can be varied from the illustrative examples shown.

The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 400 is any hardware apparatus that may store data. Memory 406, persistent storage 408 and computer readable media 418 are examples of storage devices in a tangible form.

In another example, a bus system may be used to implement communications fabric 402 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 406 or a cache such as found in an interface and memory controller hub that may be present in communications fabric 402.

Figure 5:
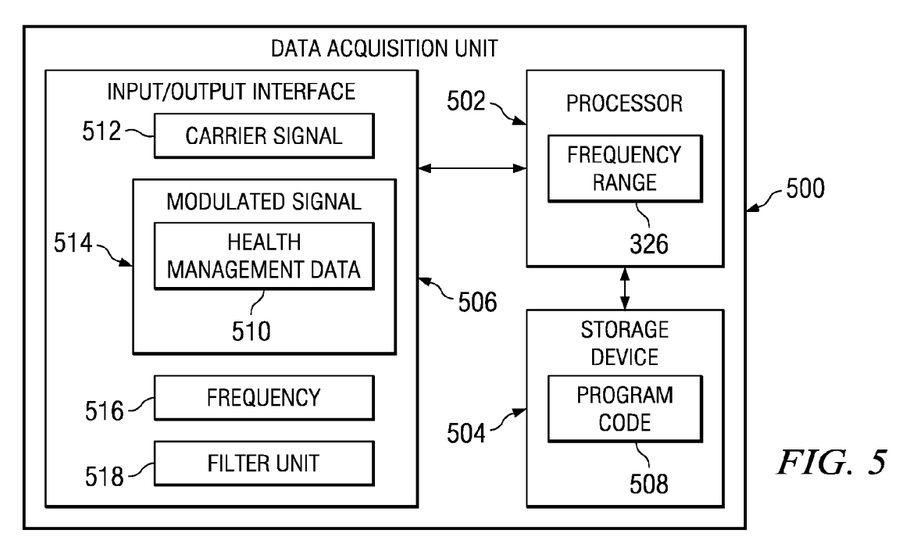
FIG. 5 is diagram of a data acquisition unit in accordance with an advantageous embodiment.

Turning now to FIG. 5, diagram of a data acquisition unit is depicted in accordance with an advantageous embodiment. In this illustrative example, data acquisition unit 500 is an example of one implementation for a data acquisition unit within data acquisition units 306 in FIG. 3.

As depicted, data acquisition unit 500 includes processor 502, storage device 504 and input/output interface 506. Processor 502 may be a single processor or a multi core processor in these examples. Of course, in other advantageous embodiment multiple processors may be present within data acquisition unit 500.

Storage device 504 may be, for example, a memory, a disk drive, or some other suitable storage device. Input/output interface 506 may provide an interface to receive signals from sensors such as, for example, sensors 308 in FIG. 3. If the sensors transmit analog signals, input/output interface 506 may convert the analog signals into a digital form for processing by processor 502. Further, input/output interface 506 also may transmit both analog and/or digital signals to transmit health management data and/or perform testing.

Program code 508 in storage device 504 may be executed by processor 502 to handle incoming data from sensors and/or other sources. Further, program code 508 may include instructions for processing data or transmitting data. For example, program code 508 may cause processor 502 to generate a carrier signal such as a sine wave and send the carrier signal to another data acquisition unit.

When a signal is received from input/output interface 506 by data acquisition unit 500, processor 502 may process that signal and generate health management data 510. Additionally, processor 502 may cause input/output interface 506 to transmit carrier signal 512 to another data acquisition unit. Further, processor 502 may cause input/output interface 506 to generate modulated signal 514 for transmission to another data acquisition unit.

Modulated signal 514 may contain data such as, for example, health management data 510. Both carrier signal 512 and modulated signal 514 may be transmitted using frequency 516. In these examples, frequency 516 is selected to have a frequency outside a frequency range used by other data processing systems. Further, frequency 516 may be selected to be different from the frequency used by other data acquisition units. In this manner, the particular frequency used by data acquisition unit 500 may be used to identify data acquisition unit 500.

Further, data acquisition unit 500 may perform tests of the bus systems and/or wires to identify whether intermittent faults or other faults may be present. In these examples, carrier signal 512 may be sent to another data acquisition unit and/or device. If an acknowledgement is received that carrier signal 512 was received without distortion, then the data acquisition unit 500 may send modulated signal 514. When testing occurs, modulated signal 514 is a form of carrier signal 512 with modulations to include data. This data may take the form of test patterns for comparison by another data acquisition unit receiving modulated signal 514.

In some advantageous embodiments, data acquisition unit 500 also may act as a receiver. With this type of implementation, data acquisition unit 500 may receive signals and/or health management data from other data acquisition units. With this type of implementation of data acquisition 500, filter unit 518 may be used to identify signals that are to be processed by data acquisition unit 500.

For example, if data acquisition unit 500 is to receive carrier signal 512 and/or modulated 514 from another data acquisition unit, filter unit 518 may be used to identify the appropriate signal to process. Modulated signals and carrier signals sent by other data acquisition units may be ignored by data acquisition unit 500 if filter unit 518 does not identify their signals for processing.

In these examples, filter unit 518 may be implemented within different components. In this illustrative example, filter unit 518 may be located within input/output interface 506. In other advantageous embodiments, filter unit 518 may be implemented in program code 508 executed by processor 502 to filter out signals received by input/output interface 506.

In yet other advantageous embodiments, filter unit 518 may be used to identify the source of the received signals. This identification may be used by data acquisition unit 500 to route these signals to an appropriate destination.

For example, data acquisition unit 500 may route signals and/or management data to a data processing system or another data acquisition unit depending on the frequency identifying the data acquisition unit transmitting the signal.

Data acquisition unit 500 may generate health management data from signals received from other data acquisition units. This data may be information about testing performed. Data acquisition unit 500 may send this data to the appropriate destination, such as a health management computer and/or some other suitable destination.

Figure 6:
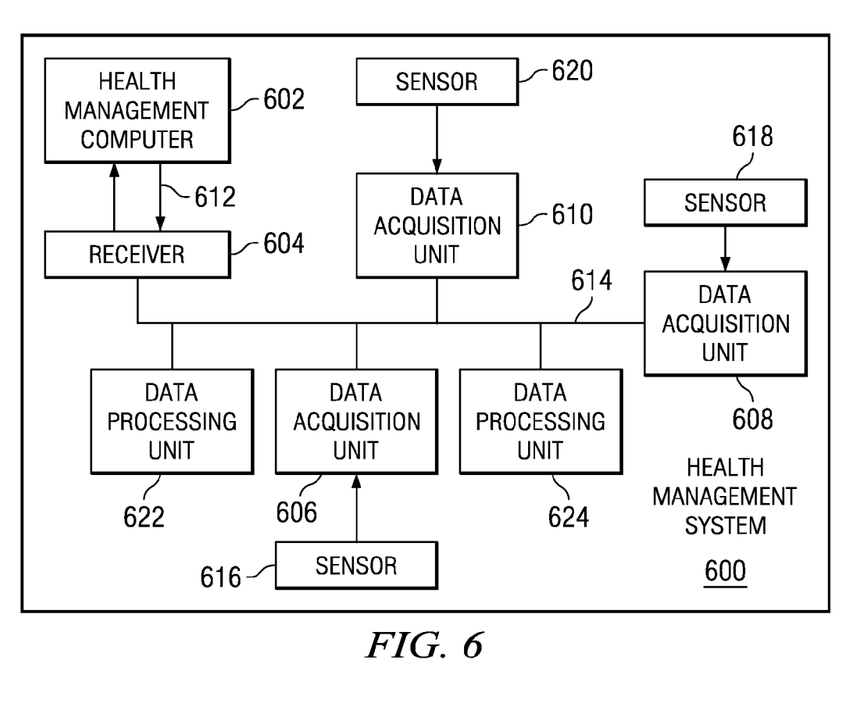
FIG. 6 is a diagram illustrating example of the health management system in accordance with an advantageous embodiment.

With reference now to FIG. 6, a diagram illustrating an example of a health management system is depicted in accordance with an advantageous embodiment. In this example, health management system 600 is an example of one implementation of health management system 300 in FIG. 3. In this illustrative example, health management system 600 includes health management computer 602, receiver 604, data acquisition unit 606, data acquisition unit 608, and data acquisition unit 610.

In this illustrative example, receiver 604 is a data acquisition unit. These data acquisition units are implemented using data acquisition unit 500 in FIG. 5. Health management computer system 602 may be implemented using a data acquisition processing system such as, for example, data processing system 400 in FIG. 4.

In this illustrative example, health management computer 602 may communicate with receiver 604 over bus 612. Bus 612 may be a power bus and/or data bus depending on the particular implementation. Receiver 604 and data acquisition units 606, 608, and 610 are connected to each other through bus 614. Bus 614 may be a data bus and/or a number of different wires. Bus 612 and bus 614 may be part of a network such as, for example, network 310 in FIG. 3.

Data acquisition units 606, 608, and 610 may receive data from sources such as sensors 616, 618, and 620. Sensor 616 is connected data acquisition unit 606, sensor 618 is connected to data acquisition unit 608, and sensor 620 is connected to data acquisition unit 610.

These data acquisition units may transmit health management data to receiver 604 using different frequencies. Receiver 604 may identify the particular data acquisition units transmitting the signal based on the frequency. Receiver 604 may process this data and send health management data to health management computer 602 over bus 612. For example, receiver 604 may include identification of a particular data acquisition unit or the frequency at which the data was received.

Further, receiver 604 and data acquisition units 606, 608, and 610 may perform testing of bus 614. For example, data acquisition unit 606 may transmit a carrier signal to receiver 604. If the carrier signal is undistorted, receiver 604 may send a response to data acquisition unit 606 indicating that the signal was successfully received.

The carrier signal is considered to be undistorted if the carrier signal received by receiver 604 substantially matches what is expected to be received from data acquisition unit 606. Data acquisition unit 606 may then send a modulated signal to receiver 604. Receiver 604 may compare the modulated signal with a prior modulated signal. If the signals match within a tolerance level, no fault is detected. If a match is not present, then a fault or faults may be identified by the receiver 604. Receiver 604 may identify the source of the carrier signal and modulated signals based on the frequency used by the data acquisition units.

Further, depending on the bandwidth available on bus 614, data acquisition units 606, 608, and 610 perform this type of testing and/or sending of health management data at different time periods such that only one or a limited number of data acquisition units are transmitting data and/or performing testing at any one time over bus 614. Of course, in some advantageous embodiments, receiver 604 may not send an acknowledgement to the data acquisition units. Instead, the data acquisition units may send a carrier signal followed by a modulated signal without waiting for a response.

Further, receiver 604 may check the capacity or bandwidth for bus 614. Receiver 604 may implement currently used techniques for checking bandwidth on busses and networks. If the bandwidth is too low or is less than some threshold, receiver 604 may send commands to one or more of data acquisition units 606, 608, and 610 to halt transmission of signals. Receiver 604 may send requests to data acquisition units 606, 608, and 610 to resend the signals at a later time.

In this manner, maximum usage of bandwidth and bus 614 may be achieved. The different tests performed and health management data generated by receiver 604 and data acquisition units 606, 608, and 610 may be transmitted in a manner that avoids interference with data transmitted by other components outside of the health monitory system. In this manner, the bandwidth used by components may not be reduced and/or impacted by health management system 600.

For example, data processing unit 622 and data processing unit 624 may normally communicate with each other over bus 614. These data processing units may be implemented using data processing system 400 in FIG. 4. Receiver 604 and data acquisition units 606, 608, and 610 may be connected to bus 614. The components in health management system 600 may operate without impacting the normal communication of data between data processing unit 622 and data processing unit 624. Data processing unit 622 and data processing unit 624 may use a different range of frequencies from receiver 604 and data acquisition units 606, 608, and 610.

Figure 7:
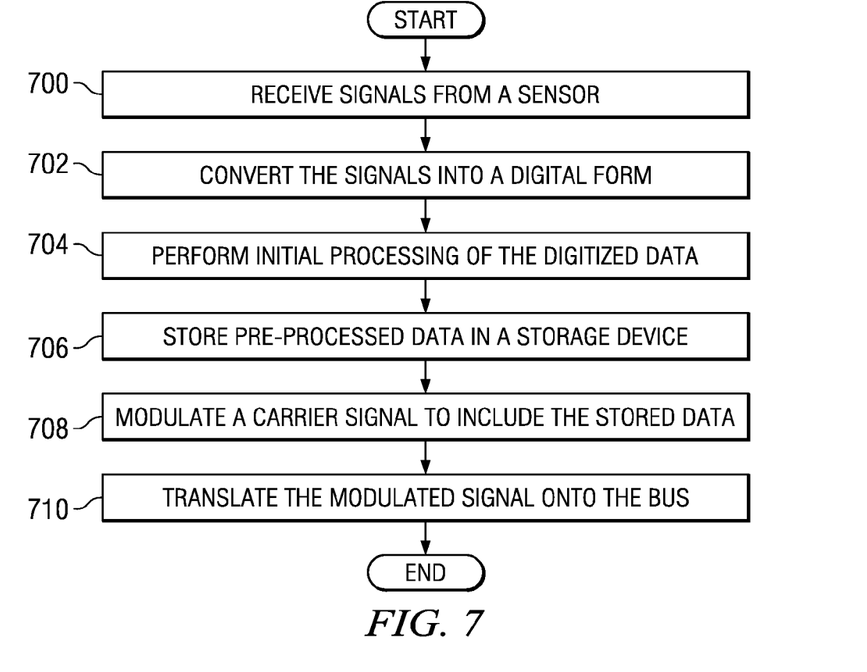
FIG. 7 is a flowchart of a process for generating health management data in accordance with an advantageous embodiment.

With reference now to FIG. 7, a flowchart of a process for generating health management data is depicted in accordance with an advantageous embodiment. The process illustrated in FIG. 7 may be implemented in a component such as, for example, data acquisition unit 500 in FIG. 5. More specifically, the different operations in this flowchart may be implemented in program code 508 for execution by processor 502.

The process may begin by receiving signals from a sensor (operation 700). The process then converts the signals into a digital form (operation 702). Initial processing of the digitized data may be performed (operation 704). This initial processing may include, for example, removing noise, performing calculations, and/or other suitable processing of the data. Pre-processed data is then stored in a storage device (operation 706).

Thereafter, a carrier signal is modulated to include the stored data (operation 708). The modulated signal is then translated onto the bus (operation 710), with the process terminating thereafter. The pre-processed data may be stored such that the data is transmitted periodically. In other advantageous embodiments, the data may be sent only after a certain amount of data has been collected and/or a certain amount of time has passed.

Figure 8:
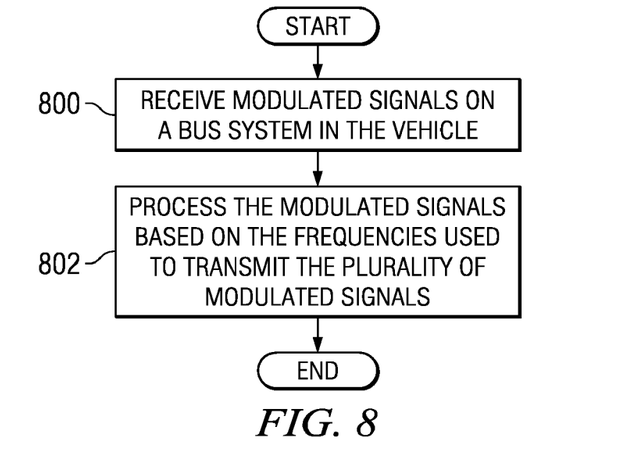
FIG. 8 is a flowchart of a process for processing a signal in accordance with an advantageous embodiment.

With reference not to FIG. 8, a flowchart of a process for processing a signal is depicted in accordance with an advantageous embodiment. The process illustrated in FIG. 8 may be implemented in a component such as, for example, data acquisition unit 500 in FIG. 5. More specifically, the different operations in this flowchart may be implemented in program code 508 for execution by processor 502.

The process begins by receiving modulated signals on a bus system in the vehicle (operations 800). The modulated signals may contain health management data from a plurality of data acquisition units. Each modulated signal has a different frequency from another modulated signal in the plurality of modulated signals. The frequencies are selected to avoid interference with other data transmitted over the bus system by a plurality of data processing systems in the vehicle.

The modulated signals are processed based on the frequencies used to transmit the plurality of modulated signals (operation 802), with the process terminating thereafter. The processing in operation 802 may include, analyzing the data in the signal, routing the signal to a destination, and/or some other suitable type of processing.

Figure 9:
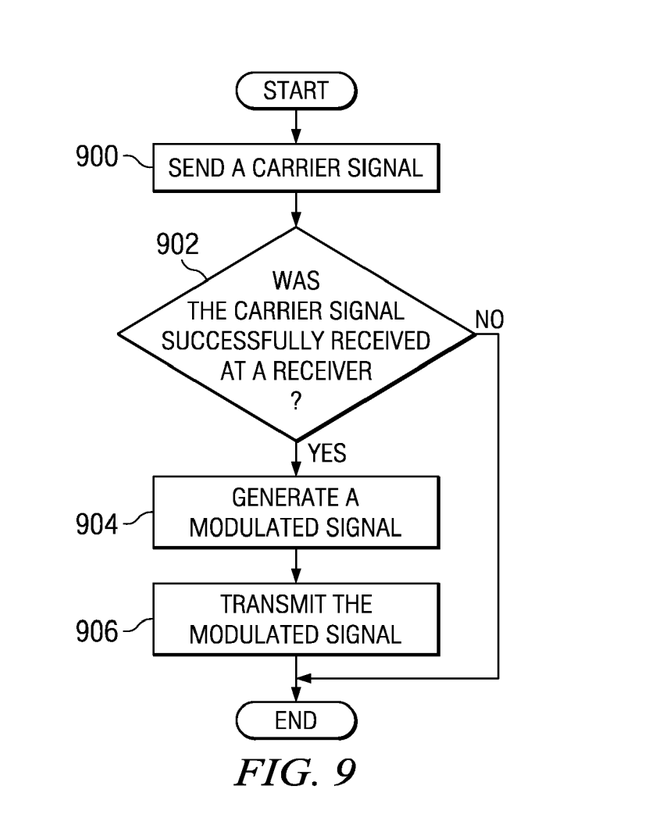
FIG. 9 is a flowchart of a process for testing a network in accordance with an advantageous embodiment.

With reference now to FIG. 9, a flowchart of a process for testing a network is depicted in accordance with an advantageous embodiment. The process illustrated in FIG. 9 may be implemented in a component such as, for example, data acquisition unit 500 in FIG. 5. This process may be included as instructions in program code 508 for execution by processor 502.

The process begins by sending a carrier signal (operation 900). This carrier signal may be a sinusoidal waveform. The process then determines whether the carrier signal was successfully received at a receiver (operation 902). This determination may be made by receiving a response from the receiver. If the carrier signal was successfully received, the process then generates a modulated signal (operation 904). This modulated signal may include data such as, for example, a test pattern. The process then transmits the modulated signal (operation 906), with the process terminating thereafter.

With reference again to operation 902, if the carrier signal was not successfully received, the process then also terminates.

This process may be repeated in response to events. The event may be a non-periodic event such as a request from another component. In other advantageous embodiments, the event may be a periodic event such as the expiration of a timer.

Figure 10:
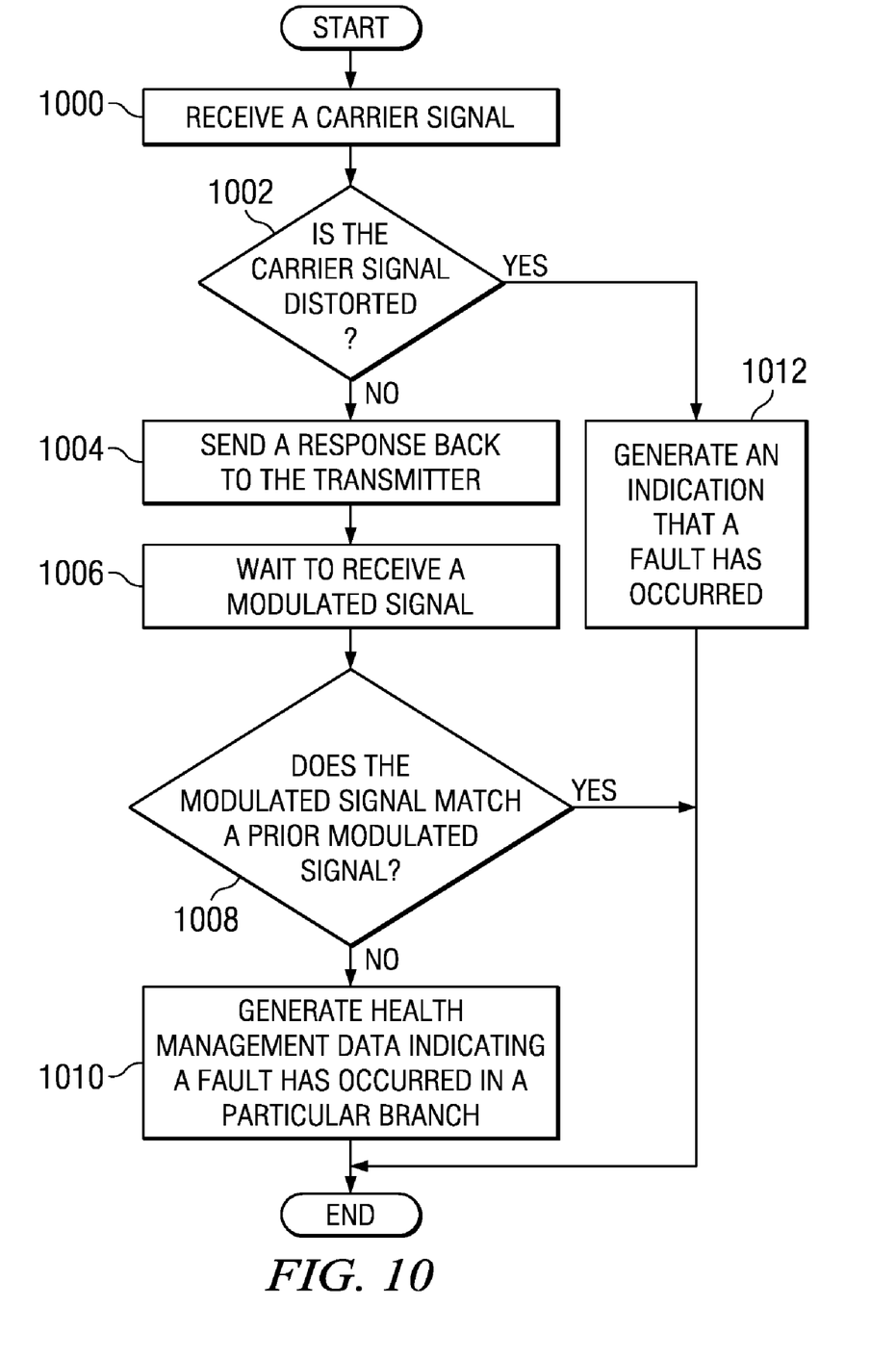
FIG. 10 is a flowchart of a process for testing a network in accordance with an advantageous embodiment.

With reference now to FIG. 10, a flowchart of a process for testing a network is depicted in accordance with an advantageous embodiment. The process illustrated in FIG. 10 may be implemented in a process such as, for example, data acquisition unit 500 in FIG. 5. In these examples, this process may be implemented in program code 508 for execution by processor 502. This process may be used to receive test signals and analyze these test signals.

The process may begin by receiving a carrier signal (operation 1000). Next, a determination is made as to whether the carrier signal is distorted (operation 1002). This determination may be made by examining the signal to see whether the signal is periodic and has the phase, frequency, and/or amplitude expected for the carrier signal. If the carrier signal is undistorted, a response is sent back to the transmitter (operation 1004). The process then waits to receive a modulated signal (operation 1006).

When a modulated signal is received, a determination is made as to whether the modulated signal matches a prior modulated signal (operation 1008). This determination may be made by comparing the received modulated signal with data or another signal that is expected. The received modulated signal may be modulated with a test pattern that is expected to be received by the process.

If the modulated signal is correct, the process terminates. Otherwise, the process then generates health management data indicating a fault has occurred in the particular branch (operation 1010). This data may include identification of the branch as well as an indication that a fault is present along with a timestamp. The process terminates thereafter. The health management data generated by this process may be transmitted to another system for analysis using a process such as that in FIG. 5.

With reference again to operation 1002, if the carrier signal is distorted, the process may generate an indication that a fault has occurred (operation 1012), with the process terminating thereafter.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of computer usable or readable program code, which comprises one or more executable instructions for implementing the specified function or functions.

In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

Thus, the different advantageous embodiments provide a method and apparatus for processing health management data. Health management data may be processed for a vehicle. A plurality of modulated signals may be received on a bus system in the vehicle. The plurality of modulated signals contain health management data from a plurality of data acquisition units and each modulated signal has a different frequency from another modulated signal in the plurality of modulated signals to form a plurality of frequencies.

The plurality of frequencies is selected to avoid interference with other data transmitted over the bus system by a plurality of data processing systems in the vehicle. The plurality of modulated signals is processed based on the frequencies used to transmit the plurality of modulated signals.

In this manner, bandwidth used by other data processing systems on vehicle may remain unused by the health monitoring systems and processes. This use of the bus system may avoid the need to have a separate bus or network for use in health monitoring and may reduce weight and cost for a vehicle.

The different advantageous embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer-usable or computer-readable medium providing program code for use by or in connection with a computer or any device or system that executes instructions. For the purposes of this disclosure, a computer-usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non-limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W) and DVD.

Further, a computer-usable or computer-readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example, without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters are just a few of the currently available types of communications adapters.

The description of the different advantageous embodiments has been presented for purposes of illustration and description, and is not intended to be exhaustive or limited to the embodiments in the form disclosed. For example, although the illustrative examples have been described with respect to an aircraft, some advantageous embodiments may be applied to other types of vehicles. For example, in some advantageous embodiments, the vehicle may be a surface ship, a tank, a personnel carrier, a train, a spacecraft, a submarine, a bus, an automobile, or some other suitable vehicle. Many modifications and variations will be apparent to those of ordinary skill in the art. Further, different advantageous embodiments may provide different advantages as compared to other advantageous embodiments.

The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for processing health management data for a vehicle, the method comprising:
   receiving a plurality of modulated signals on a bus system in the vehicle, wherein the plurality of modulated signals contain health management data from a plurality of data acquisition units, wherein each modulated signal has a different frequency from another modulated signal in the plurality of modulated signals to form a plurality of frequencies, and wherein the plurality of frequencies are selected to avoid interference with other data transmitted over the bus system by a plurality of data processing systems in the vehicle; and
   processing the plurality of modulated signals based on the plurality of frequencies used to transmit the plurality of modulated signals.

2. The method of claim 1 further comprising:
   generating the health management data using a number of sensors.

3. The method of claim 1 further comprising:
   sending a carrier signal from a transmitter data acquisition unit within the plurality of data acquisition units to a receiver data acquisition unit within the plurality of data acquisition units on the bus system using the frequency that avoids interference between the data transmitted between the plurality of data processing systems;
   determining whether the carrier signal is distorted at the receiver data acquisition unit;

responsive to a determination that the carrier signal is not distorted at the receiver data acquisition unit, generating a modulated signal containing data;

sending the modulated signal to the receiver data acquisition unit to form a received modulated signal; and comparing the received modulated signal with a prior modulated signal at the receiver data acquisition unit to determine whether a fault is present in its path.

4. The method of claim 2, further comprising:
generating the health management data at the transmitter data acquisition unit from using the number of sensors associated with the vehicle.

5. The method of claim 1, wherein the plurality of modulated signals are transmitted by the plurality of data acquisition units at different time periods.

6. The method of claim 1, wherein the plurality of data processing systems includes a flight management computer and a controller.

7. The method of claim 1, wherein the vehicle is selected from a group comprising an aircraft, a surface ship, a tank, a personnel carrier, a train, a spacecraft, a submarine, a bus, and an automobile.

8. A vehicle comprising:
a bus system;
a first data processing system connected to the bus system;
a second data processing system connected to the bus system, wherein the first data processing system and the second data processing system exchange data with each other over the bus system; and
a number of data acquisition units connected to the bus system, wherein the number of data acquisition units is capable of testing the bus system for errors and capable of transmitting health management data over the bus system using a frequency that avoids interfering with data transferred between the first data processing system and the second data processing system.

9. The vehicle of claim 8 further comprising:
a number of sensors, wherein the number of data acquisition units generate health management data using the number of sensors.

10. The vehicle of claim 8, wherein the number of data acquisition units include a receiver and a transmitter and wherein the transmitter is capable of sending a carrier signal from the transmitter to the receiver through a path using the frequency that avoids interference between the data transmitted between the first data processing system and the second data processing system on the path; the receiver capable of determining whether the carrier signal received by the receiver is distorted; the transmitter capable of generating a modulated signal containing data and sending the modulated signal to the receiver to form a received modulated signal, and the receiver capable of comparing the received modulated signal with a prior modulated signal to determine whether a fault is present in the path.

11. The vehicle of claim 8, wherein the first data processing system is a flight management computer and the second data processing system is a controller.

12. The vehicle of claim 8, wherein the vehicle further comprises:
an airframe; and
a propulsion system.

13. The vehicle of claim 8, wherein the vehicle is selected from one of an aircraft, a surface ship, a tank, a personnel carrier, a train, a spacecraft, a submarine, a bus, and an automobile.

14. A computer program product for processing health management data for a vehicle, the computer program product comprising:

a non-transitory computer readable storage medium;

program code, stored on the computer readable storage medium, for receiving a plurality of modulated signals on a bus system in the vehicle, wherein the plurality of modulated signals contain health management data from a plurality of data acquisition units, wherein each modulated signal has a different frequency from another modulated signal in the plurality of modulated signals to form a plurality of frequencies, and wherein the plurality of frequencies are selected to avoid interference with other data transmitted over the bus system by a plurality of data processing systems in the vehicle; and program code, stored on the computer readable storage medium, for processing the plurality of modulated signals based on the plurality of frequencies used to transmit the plurality of modulated signals.

15. The computer program product of claim 14 further comprising:
program code, stored on the computer readable storage medium, for generating the health management data using a number of sensors.

16. The computer program product of claim 14 further comprising:
program code, stored on the computer readable storage medium, for sending a carrier signal from a transmitter data acquisition unit within the plurality of data acquisition units to a receiver data acquisition unit within the plurality of data acquisition units on the bus system using the frequency that avoids interference between the data transmitted between the plurality of data processing systems;
program code, stored on the computer readable storage medium, for determining whether the carrier signal is distorted at the receiver data acquisition unit;
program code, stored on the computer readable storage medium, for, generating a modulated signal containing data in response to a determination that the carrier signal is not distorted at the receiver data acquisition unit;
program code, stored on the computer readable storage medium, for sending the modulated signal to the receiver data acquisition unit to form a received modulated signal; and
program code, stored on the computer readable storage medium, for comparing the received modulated signal with a prior modulated signal at the receiver data acquisition unit to determine whether a fault is present in a path.

17. The computer program product of claim 15, further comprising:
program code, stored on the computer readable storage medium, for generating the health management data at the transmitter data acquisition unit from using the number of sensors associated with the vehicle.

18. The computer program product of claim 14, wherein the plurality of modulated signals are transmitted by the plurality of data acquisition units at different time periods.

19. The computer program product of claim 14, wherein the plurality of data processing systems includes a flight management computer and a controller.

20. The computer program product of claim 14, wherein the vehicle is selected from a group comprising an aircraft, a surface ship, a tank, a personnel carrier, a train, a spacecraft, a submarine, a bus, and an automobile.

* * * * *